May 23, 1961 R. L. FISCHER ET AL 2,985,244
PROPELLER BLADE PITCH LOCK CONTROL MEANS
Filed Nov. 27, 1957 2 Sheets-Sheet 1

INVENTORS
RICHARD L. FISCHER
NORMAN B. NEWTON
EDMUND M. WALACAVAGE
BY Vernon F. Hauschild
ATTORNEY

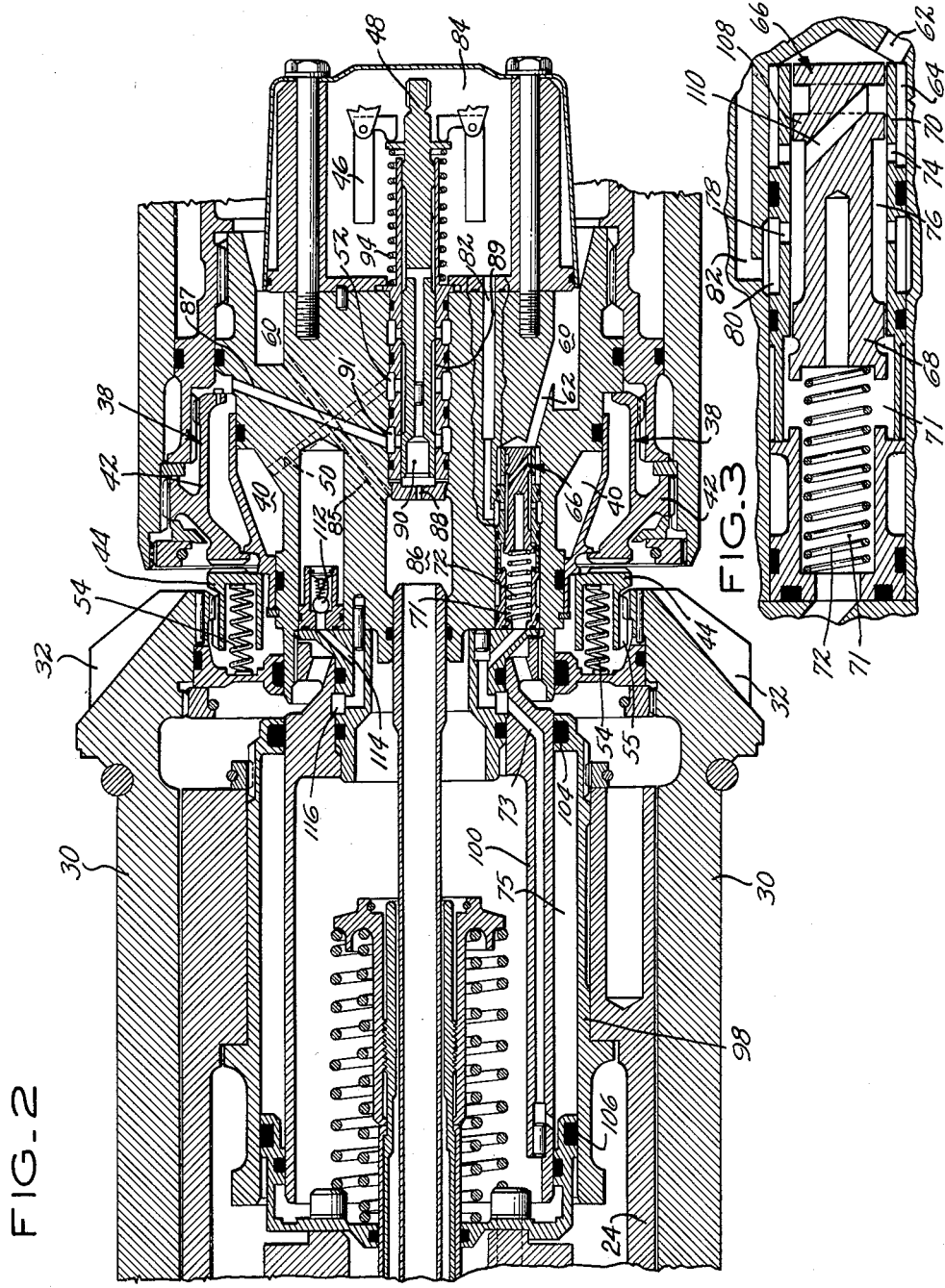

United States Patent Office 2,985,244
Patented May 23, 1961

2,985,244

PROPELLER BLADE PITCH LOCK CONTROL MEANS

Richard L. Fischer, Suffield, Norman B. Newton, South Glastonbury, and Edmund M. Walacavage, West Simsbury, Conn., assignors to United Aircraft Corporation, East Hartford, Conn., a corporation of Delaware Filed Nov. 27, 1957, Ser. No. 699,385

8 Claims. (Cl. 170—160.32)

This invention relates to propellers of the variable pitch aircraft type and the overspeed arming pitch locks used therewith and more particularly with disabling means for the overspeed arming means during periods when the propeller blade pitch angle is increasing.

In the past, propellers of the aircraft type have used speed sensitive governors to control propeller speed and to vary propeller pitch to maintain the desired propeller speed, but these governors were found to hunt more than a desirable amount when re-establishing governor dictated speed, for they failed to provide the anticipating effect attained when the propeller governor can include means to detect propeller speed rate of change or acceleration or engine acceleration. A serious difficulty was encountered when pitch change acceleration effect was incorporated into propeller governors since, for example, when the governor is attempting to re-establish the desired propeller speed after an engine throttle burst, the overspeed sensitive pitch lock arming means would not permit the pitch locks to be disarmed by the time the governor called for a decrease in pitch angle so that the first movement toward a decreased pitch angle would lock the pitch locks, due to their ratchet action, and prevent any pitch decrease. The governor would continue to call for decrease blade pitch angle since the propeller will be operating below governor dictated r.p.m. but pitch reduction could never be attained since, due to the shape of the ratcheting pitch lock teeth, a slight motion toward increase pitch is necessary to permit pitch lock disarming.

It is an object of this invention to provide means for disabling a normally disarmed overspeed armed propeller pitch lock during periods of propeller pitch increase, while permitting the pitch lock to operate normally under all other conditions so that such a pitch lock may be utilized in combination with a propeller governor which is both speed and acceleration sensitive and therefore anticipates requirements.

Other objects and advantages will be apparent from the specifications and claims, and from the accompanying drawings which illustrate an embodiment of the invention.

Fig. 2 is an enlarged showing of a portion of this propeller to more particularly illustrate this invention.

Fig. 3 is a fragmentary enlarged showing of a portion of this invention to show the pitch lock disarming valve in its normal position.

Figure 1:
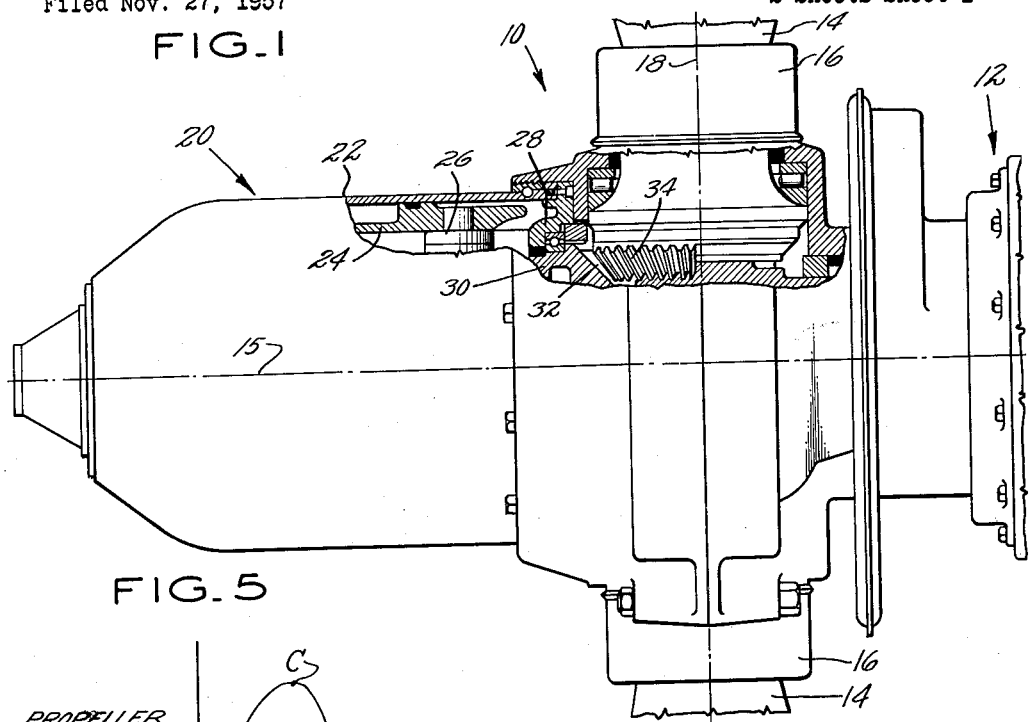
Fig. 1 is an external view of a typical variable pitch aircraft propeller, partially broken away to illustrate this invention.

Referring to Fig. 1 we see a propeller unit of the aircraft type 10, described more particularly in U.S. Patent Nos. 2,280,713 and 2,280,714, driven by a typical aircraft engine 12 of the type described and claimed in Patent Nos. 2,711,631 and 2,700,946. Reference may be made to the aforementioned patents for a more detailed description of a propeller and an engine. Propeller unit 10 comprises a plurality of blades 14 projecting from, supported by, and rotatable about axis 15 with and about axis 18 with respect to propeller hub unit 16. The rotation of propeller blades 14 about their longitudinal axis 18 with respect to hub unit 16 constitutes a change of propeller blade pitch angle while rotation of blades 14 about axis 15 constitutes propulsive rotation. Pitch change motor 20 is provided to change the pitch of propeller blades 14. Pitch change motor 20 comprises propeller dome or cylinder 22 and movable piston 24. Piston 24 reciprocates within dome 22 and carries rollers or cam followers 26 therewith, which rollers 26 co-act with stationary cam slot member 28 and rotary cam slot member 30 to cause relative rotation between the last two members. Rotary member 30 carries gear ring 32 which engages with mating ring 34, the latter of which is carried by propeller blades 14, so that the rotation of rotary member 30 causes the rotation about axis 18 of propeller blades 14. Since stationary member 28 is fixed with respect to propeller hub unit 16, the relative rotation between members 28 and 30 causes relative rotation between propeller blades 14 and propeller hub 16 which, as described previously, constitutes propeller pitch change.

As piston 24 moves toward blades 14, the blades rotate to increase their pitch angle whereas when cylinder 24 moves away from blades 14 the blades rotate to decrease their pitch angle. Pressurized hydraulic actuating fluid may be selectively admitted to either side of piston 24 to vary blade pitch angle. The above brief description of the propeller blade pitch change mechanism is believed to suffice for the present purpose since such mechanism is old and described in greater particularity in U.S. Patent Nos. 2,653,688 and 2,758,659, to which reference may be made.

Fig. 2 shows blade pitch lock unit 38 which serves the function, when not disarmed by the pressure of the actuating fluid used in pitch change motor 20, which is also introduced to chamber 40, of preventing propeller blades 14 from reducing in pitch. This is important since, if left to seek their own pitch angle during rotation and/or in flight, propeller blades 14 would rotate to a zero degree pitch angle. At the zero degree pitch angle, minimum aerodynamic resistance to rotation is presented to the blades and consequent propeller overspeeding would occur to the potential destruction of both propeller 10 and engine 12. Pitch lock unit 38 includes stationary member 42 and rotary member 44, both of which carry angled cooperating teeth which are so formed as to ratchet with respect to one another to permit propeller blade pitch increase even when pitch lock unit 38 is armed and also to prevent propeller blade pitch decrease due to tooth intermeshing. Therefore, due to the construction of pitch lock unit 38, blades 14 cannot rotate to the potentially destructive zero degree pitch angle when pitch change motor 20 is ineffective to vary pitch angle. During normal engine and propeller operation, propeller pitch lock unit 38 is disabled due to the presence of high pressure actuating fluid in chamber 40, thereby permitting the propeller blades 14 to change pitch angle as dictated by propeller governor. Since propeller overspeed, that is propeller speed of rotation about axis 15 (Fig. 1) above governor setting, is indicative of possible malfunction, pitch lock unit 38 is designed to be armed during periods of propeller overspeed. Flyballs 46 are set to fling outwardly due to centrifugal force as they rotate with propeller hub 16 when the governor dictated speed is exceeded and their outward movement moves pilot valve 48 thereby draining the pressurized hydraulic fluid in cavity 40 through line 50 and annulus 52. This permits springs 54 to cause rotary pitch lock member 44, which is splined at 55 to rotary cam slot member 32, to translate toward and engage stationary pitch lock member 42 thereby arming pitch lock unit 38. Pitch lock construction and its actuation due to the angularity of the pitch lock ratchet member or teeth, has been previously described above and such is believed to be sufficient since the mechanism is old and is described in greater particularity in U.S. Patent No. 2,703,148.

As previously mentioned, it would be impossible to decrease pitch in an overspeed armed pitch lock system utilizing a speed sensitive and acceleration sensitive governor due to the fact that the inherent sluggishness of the pitch lock system does not permit pitch lock disarming before a decreased pitch signal is received by governor so that pitch lock mechanism 38 locks and propeller pitch decrease is impossible thereafter. This problem may be fully understood by considering the following description in conjunction with Figs. 5 and 6. If, for any reason, the airplane pilot pushes his throttle toward increased power sharply, called throttle burst, the engine horsepower would increase to a point that it is in excess of the horsepower being absorbed by the propeller at its present pitch angle. This would cause propeller speed to increase from point S on the Fig. 5 graph, which is 100% of the governor dictated speed, to point A. At point A, which by way of example is shown to represent 102% of governor dictated speed, flyballs 46 are set to fly outwardly and cause the arming of pitch lock unit 38. Due to the sluggishness in any hydraulic system, the pitch locks are not armed until the propeller speed has increased to point B. The propeller speed continues to increase until it reaches point C at which point the engine horsepower output is balanced by propeller horsepower absorption and as the propeller horsepower absorption exceeds the engine horsepower output, the propeller speed decreases and eventually reaches point D of Fig. 5, at which point flyballs 46 return to their original position and permit the re-entry of fluid to pitch lock disabling piston 40. Due to the aforementioned hydraulic system sluggishness, the pitch locks are not disarmed until point F is reached. As propeller speed goes below point G, governor dictated speed is passed and the propeller hunts through speed loops H and J until the propeller is again operating at the 100% governor dictated speed (line S).

Figure 5:
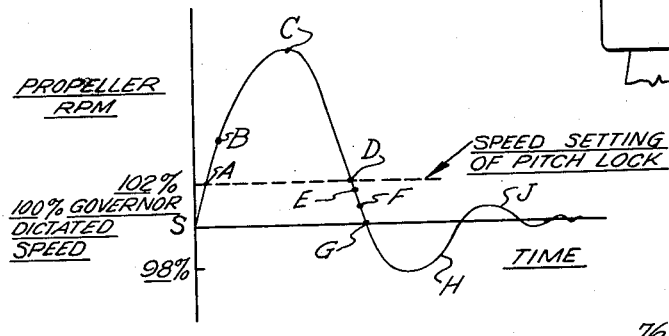
Fig. 5 is a graphic representation of propeller speed plotted against time which would be encountered as a result of an engine throttle burst.
Figure 6:
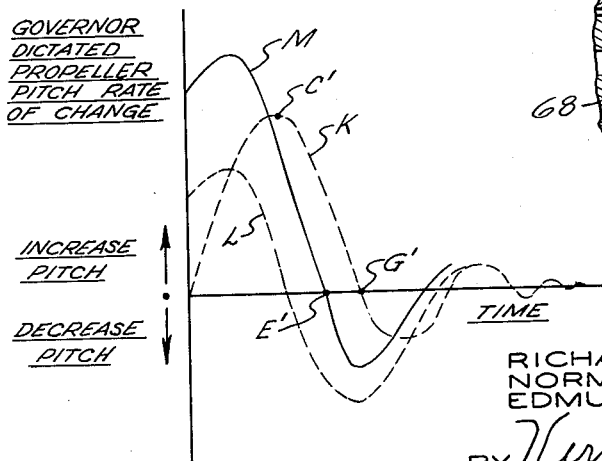
Fig. 6 is a graphic representation of governor dictated pitch rate of change against time to illustrate the problem which would be encountered should an acceleration sensitive governor be utilized with an overspeed arming pitch lock mechanism.

Now considering Fig. 6, we will examine what is happening to the propeller pitch during the overspeed situation shown in Fig. 5. If our governor were speed sensitive only, the governor dictated propeller pitch rate of change would follow curve K and when the governor called for decrease pitch at point G, because the propeller speed was about to go below the governor dictated speed, such could be accomplished for the pitch lock is already disarmed (point F.) If, however, our governor is acceleration sensitive only, our propeller pitch rate of change would follow curve L, thereby permitting governor anticipation of pitch change requirements. If both a speed and acceleration sensitive governor were used, our net propeller pitch rate of change would follow curve M. Observing curve M, it will be noted that the speed and acceleration sensitive governor calls for a decrease in pitch at point E', such would not be possible because at corresponding point E on the Fig. 5 curve our pitch lock unit 38 is still armed and will immediately lock as initial reduce pitch rotation occurs in response to the dictates of the governor for decreased blade pitch angle. It is the teaching of this invention to provide a mechanism which will disarm or disable the overspeed pitch lock mechanism during periods when the propeller blades 14 are increasing in pitch angle. This will permit the pitch lock disarming system to remain activated to hold members 42 and 44 of pitch lock unit 38 separated and thereby prevent the locking thereof when propeller blades attempt to decrease in pitch in accordance with speed and acceleration sensitive governor dictates.

Figure 4:
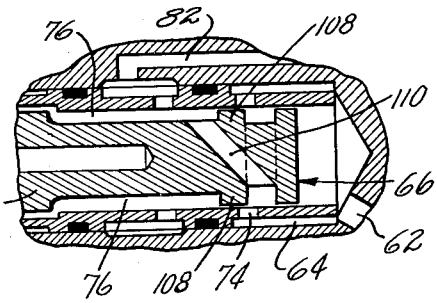
Fig. 4 is a fragmentary enlarged showing of a portion of this invention to show the pitch lock disarming valve in its shifted and disarming pressure regulating position.

The mechanism for accomplishing this purpose is best shown in Figs. 2, 3 and 4. During normal operation, a selected high pressure fluid which is being transmitted to pitch change motor 20 enters annular cavity 60 and passes through line 62 into annular chamber 64 which surrounds disarming valve 66. Disarming valve 66 includes piston member 68 translating within cylinder member 70. Spring 72 serves to bias piston member 68 to the right as shown in Fig. 3 so that the pressurized fluid in cavity 64 passes through port 74 of cylinder 70 and thence through annular chamber 76, port 78 and annular chamber 80 into line 82 which leads into overspeed flyball chamber 84. Similar pressure is directed from cavity 60, then through line 85, through chamber 86 and line 88 into chamber 90 such that sliding valve 48, which when moved causes the draining of the high pressure fluid from cavity 40 through line 50, annuli 89, 91 and line 87 is substantially in hydraulic balance. In addition to passing to chamber 84 through line 82, the high pressure fluid within annular chamber 76 may also pass through the lapped and hence slight clearance formed between piston 68 and cylinder 70 to enter chamber 71 and then flow through line 73 into cavity 75. Spring 94 serves to bias valve 48 toward the right as shown in Fig. 2, however, during overspeed conditions, flyballs 46 are flung outwardly and overcome the force of spring 94 to move valve 48 to the left and thereby drain cylinder 40 permitting spring 54 to arm or engage pitch lock unit 38. Our mechanism operates as just described, and therefore permits normal pitch lock operation under all conditions except when the propeller blades 14 are rotating toward a higher pitch. When the propeller blades 14 are rotating to a higher pitch, skirt 98, which is carried by or is part of pitch change motor piston 24 moves to the right with respect to stationary sleeve 100 to its Fig. 2 or feather position, thereby increasing the volume of cavity 75 and reducing the pressure therein due to this volumetric increase, as cavity 75 is sealed by seal members 104 and 106. This reduction in pressure within cavity 75 also reduces the pressure within line 73 and cavity 71 such that the pressure differential across disarming valve 66 caused by the volume increase of cavity 75 and the lapped clearance between piston 68 and cylinder 70 forces piston 68 to the left, against the urging of spring 72 so as to initially cause land 108 to block off port or aperture 74 thereby preventing the flow of high pressure fluid from chamber 64 to chamber 84. This initial movement of valve unit 66 also puts cavity 76 into direct communication with cavity 71, thereby placing cavity 84 into communication with cavity 75 and thereby substantially reducing the pressure within cavity 84. The reduction of pressure within cavity 84 places a pressure differential on sliding valve 48 which, in combination with the urging of spring 94, is sufficiently strong that flyballs 46 are no longer able to move valve 48 to the left to bleed cavity 40 by aligning line 50 with annulus 52, which connects to drain line 87 through annuli 89 and 91 permitting the arming of pitch lock unit 38 in response to an overspeed condition. In this fashion, since flyballs 46 are incapable of bleeding the pressure from cavity 40, pitch lock unit 38 will be disabled at all times while the propeller blades 14 are increasing in pitch.

So that the pressure within the chamber 84 will not be reduced so drastically that to re-establish same would take a substantial period of time during which time normal operation of flyballs 46 could not be attained, disarming valve 66 is fabricated such that it serves as a pressure regulating valve for the pressure within chamber 84. This is the best shown in Fig. 4. Fig. 4 shows that piston 68 has translated toward the left further than it had initially wherein land 108 merely blocked off port 74 and hence the admission of high pressure fluid from chamber 68 into chamber 84, so that port 74 is now partially open to permit some readmittance of high pressure fluid from cavity 60 into cavity 84 through line 110, annular cavity 76, and line 82. When in its Fig. 4 position, disarming valve unit 66 is serving as a pressure regulating valve to regulate the pressure within cavity 84 such that it does not fall below a predetermined minimum.

Check valve 112 communicates with cavity 75 through line 114 and annulus 116 and serves the function of relieving the pressure within chamber 75 and its associated system to the left of piston 68 should the pressure therein build up beyond a pre-selected maximum as skirt 98 moves toward the left when pitch change motor 20 is rotating propeller blades 14 in a decrease pitch direction.

By utilizing the system just described, it is possible to use an acceleration and speed sensitive governor with an overspeed arming pitch lock mechanism, thereby gaining the anticipating benefit of acceleration sensitivity by eliminating the inherent disadvantages of inability to decrease pitch as desired due to pitch lock engagement.

It is to be understood that the invention is not limited to the specific embodiment herein illustrated and described but may be used in other ways without departure from its spirit as defined by the following claims.

We claim:

1. In a propeller having variable pitch blades, motive means including apparatus supporting said blades for rotation and apparatus to cause said blades to rotate relative to said supporting apparatus to increase and decrease blade pitch, normally disarmed locking means attached to said motive means to prevent blade pitch decrease when said motive means is ineffectual to vary blade pitch, energizing means responsive to propeller overspeed connected to said motive means to arm said locking means, and hydraulic means responsive to motion of said motive means to disable said energizing means when said propeller blades are increasing pitch.

2. In a propeller having variable pitch blades, motive means including apparatus supporting said blades for rotation and apparatus to cause said blades to rotate relative to said supporting apparatus to increase and decrease blade pitch, locking means including two locking members attached to said motive means to prevent blade pitch decrease, a power source connected to actuate said motive means and separate said locking members, means responsive to propeller overspeed connected to said motive means to engage said locking members, and means to prevent contact between said locking members when said propeller blades are increasing pitch.

3. In a propeller having variable pitch blades, motive means including apparatus supporting said blades for rotation and apparatus to cause said blades to rotate relative to said supporting apparatus to increase and decrease blade pitch, locking means including two locking members attached to said motive means to prevent blade pitch decrease, a power source to actuate said motive means and separate said locking members, locking means activating means responsive to power source loss and propeller overspeed, and means including a device separate from said locking means to disable said activating means when said propeller blades are increasing pitch.

4. In a propeller having variable pitch blades, motive means including apparatus supporting said blades for rotation and apparatus to cause said blades to rotate relative to said supporting apparatus to increase and decrease blade pitch, locking means attached to said motive means and adapted to prevent blade pitch decrease when said motive means is ineffectual to vary blade pitch, disabling means attached to said motive means and adapted normally operative to disable said locking means, overspeed responsive means attached to said motive means and adapted to overrule said disabling means and activate said locking means in response to propeller overspeed, and means including a device separate from said locking means attached to said motive means and adapted to disable said overspeed responsive means when said propeller blades are increasing pitch.

5. In a propeller having variable pitch blades, pressurized fluid operated motive means including apparatus supporting said blades for rotation and apparatus to cause said blades to rotate relative to said supporting apparatus to increase and decrease blade pitch, locking means including two locking members attached to said motive means to prevent blade pitch decrease, disabling means actuated by said pressurized fluid attached to said motive means and adapted to disable said locking means, means attached to at least one of said members to activate said locking means when said pressurized fluid loses pressure, overspeed responsive means attached to said motive means and adapted to drain said pressurized fluid actuating said disabling means and activate said locking means in response to propeller overspeed, and valve means connected to disable said overspeed responsive means when said propeller blades are increasing pitch.

6. In a propeller having variable pitch blades, a first unit supporting said blades for pitch change rotation, a second unit rotatable with respect to said first unit and rotatably engaging said blades, motive means attached to said units and adapted to cause said second unit and said blades to rotate relative to said first unit in an increase and a decrease pitch direction, locking means attached to said motive means and adapted to lock said first and second units against relative rotation in said decrease pitch direction when said motive means is ineffective to vary blade pitch, means connected to said motive means and normally operative to disarm said locking means, means responsive to propeller overspeed to overrule said disarming means and activate said locking means, and means including a device separate from said locking means connected to said motive means and operable solely when said first means is rotating said second unit and said blades in said increase pitch direction to disarm said overspeed responsive means.

7. In a propeller having variable pitch blades, a first unit supporting said blades for pitch change rotation, a second unit rotatable with respect to said first unit and rotatably engaging said blades, a hydraulic pitch change motor connected to cause said second unit and said blades to rotate relative to said first unit in an increase and a decrease pitch direction, supply means connected to supply pressurized hydraulic fluid to said motor, locking means attached to said units and adapted to lock said first and second units against relative rotation in said decrease pitch direction, a hydraulic piston connected to said supply means and responsive to said pressurized hydraulic fluid to disable said locking means, spring means connected to said piston to activate said locking means in response to loss of said pressurized activating fluid pressure in said supply means, means responsive to propeller overspeed and connected to drain said pressurized hydraulic fluid from said hydraulic piston and thereby permitting said spring means to activate said locking means, and means operable solely when said motor is rotating said second unit and said blades in said increase pitch direction to disable said overspeed responsive means, and thereby prevent draining of said fluid from said piston and hence prevent activation of said locking means.

8. In a propeller having variable pitch blades, a first unit supporting said blades for pitch change rotation, a second unit rotatable with respect to said first unit and rotatably engaging said blades, an hydraulic pitch change motor connected to cause said second unit and said blades to rotate relative to said first unit in an increase and a decrease pitch direction, locking means including two locking members attached to said units and engagable to lock said first and second units against relative rotation in said decrease pitch direction when said first means is ineffective to vary blade pitch, hydraulically operated disarming means normally operative to disarm said locking means, supply means connected to provide actuating fluid to said motor and said disarming means, normally pressure balanced means connected to said supply means and actuatable in response to propeller overspeed and connected to drain said fluid from said disarming means to disable said disarming means and activate said locking means, and pressure regulating means connected to said supply means and operable solely when said first means is rotating said second unit and said blades in said increase pitch direction to disable said normally pressure balanced means and regulate the pressure thereto.

References Cited in the file of this patent

UNITED STATES PATENTS

| | | |
|---|---|---|
| 2,592,124 | Diefenderfer | Apr. 8, 1952 |
| 2,703,148 | Pearl | Mar. 1, 1955 |
| 2,748,877 | Miller | June 5, 1956 |
| 2,796,137 | Lambeck | June 18, 1957 |
| 2,882,975 | Hirsch et al. | Apr. 21, 1959 |